(12) United States Patent
Chuah et al.

(10) Patent No.: US 7,065,359 B2
(45) Date of Patent: Jun. 20, 2006

(54) SYSTEM AND METHOD FOR SWITCHING BETWEEN BASE STATIONS IN A WIRELESS COMMUNICATIONS SYSTEM

(75) Inventors: Mooi Choo Chuah, Marlboro, NJ (US); Farooq Ullah Khan, Manalapan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 619 days.

(21) Appl. No.: 09/973,399

(22) Filed: Oct. 9, 2001

(65) Prior Publication Data

US 2003/0067896 A1    Apr. 10, 2003

(51) Int. Cl.
*H04Q 7/20* (2006.01)

(52) U.S. Cl. .................. 455/436; 455/439; 370/331
(58) Field of Classification Search ........ 455/436–444, 455/432.1, 433–434, 435.1, 437; 370/330–333, 370/341–342, 335
See application file for complete search history.

(56) References Cited

U.S. PATENT DOCUMENTS

| 5,371,738 | A | * | 12/1994 | Moelard et al. | ............ | 370/331 |
| 5,546,464 | A | * | 8/1996 | Raith et al. | ................. | 380/272 |
| 5,740,535 | A | * | 4/1998 | Rune | ......................... | 455/437 |
| 5,787,346 | A | * | 7/1998 | Iseyama | ..................... | 455/439 |
| 5,940,371 | A | * | 8/1999 | Mitts et al. | ................. | 370/236 |
| 5,940,743 | A | * | 8/1999 | Sunay et al. | ................ | 455/437 |
| 6,009,328 | A | * | 12/1999 | Muszynski | .................. | 455/442 |
| 6,038,449 | A | * | 3/2000 | Corriveau et al. | .......... | 455/439 |
| 6,038,450 | A | * | 3/2000 | Brink et al. | ................ | 455/442 |
| 6,069,883 | A | * | 5/2000 | Ejzak et al. | ................ | 370/335 |
| 6,094,574 | A | * | 7/2000 | Vance et al. | ................ | 455/415 |

(Continued)

FOREIGN PATENT DOCUMENTS

EP        0 851 633 A        7/1998

(Continued)

OTHER PUBLICATIONS

Mitts, H. et al: "Lossless Handover for Wireless ATM", MOBICOM. Proceedings of the Annual International Conference on Mobile Computing and Networking, XX, XX, Nov. 11, 1996, pp. 85-96, XP001048563, p. 88, right-hand column, line 10-p. 89, right-hand column, line 29.

(Continued)

*Primary Examiner*—Congvan Tran

(57) ABSTRACT

A base station switching system includes a wireless unit that waits before switching from a previous base station to a new base station after the wireless unit has indicated to the wireless communications system the identity of the new base station. Thus, the wireless unit continues to receive data from the previous base station, and the data forwarded to the previous base station will not be lost. For example, whenever a wireless unit decides to switch to a new base station, the wireless unit sends an indication to the wireless communications system of the identity of the selected base station. Before the wireless communications system can forward the data to the new base station, the wireless communications system continues to forward data to the previous base station. To avoid losing such data, the wireless unit continues receiving data from the previous base station. Once the previous data forwarded to the previous base station is sent to the wireless unit and/or the new data has been forwarded to the new base station, the wireless communications system can signal the wireless unit, and in response, the wireless unit can begin receiving data from the new base station.

20 Claims, 3 Drawing Sheets

U.S. PATENT DOCUMENTS

| | | | |
|---|---|---|---|
| 6,205,129 B1 * | 3/2001 | Esteves et al. | 370/331 |
| 6,216,004 B1 * | 4/2001 | Tiedemann et al. | 455/442 |
| 6,473,411 B1 * | 10/2002 | Kumaki et al. | 370/331 |
| 6,507,572 B1 * | 1/2003 | Kumar et al. | 370/335 |
| 6,571,097 B1 * | 5/2003 | Takai | 455/436 |
| 6,574,211 B1 * | 6/2003 | Padovani et al. | 370/347 |
| 6,574,473 B1 * | 6/2003 | Rinne et al. | 455/436 |
| 6,577,868 B1 * | 6/2003 | Vialen et al. | 455/441 |
| 6,609,003 B1 * | 8/2003 | Park et al. | 455/436 |
| 6,611,510 B1 * | 8/2003 | Famolari et al. | 370/335 |
| 6,628,631 B1 * | 9/2003 | Mazawa et al. | 370/331 |
| 6,628,632 B1 * | 9/2003 | Dolan | 370/332 |
| 6,628,946 B1 * | 9/2003 | Wiberg et al. | 455/434 |
| 6,650,905 B1 * | 11/2003 | Toskala et al. | 455/522 |
| 6,714,784 B1 * | 3/2004 | Forssell et al. | 455/436 |
| 6,862,449 B1 * | 3/2005 | Mohebbi et al. | 455/437 |

FOREIGN PATENT DOCUMENTS

| | | |
|---|---|---|
| EP | 1 059 820 A | 12/2000 |
| EP | 1059820 A2 * | 12/2000 |

OTHER PUBLICATIONS

Bender, P., et al: "CDMA/HDR: A Bandwidth-Efficient High-Speed Wireless Data Services for Nomadic Users" IEEE Communications Magazine, IEEE Service Center, Piscataway, N.J., US. vol. 38, No. 7, Jul. 2000, pp. 70-77, XP000969718, ISSN: 0163-6804, p. 71, right-hand column, line 33-line 49, p. 73, left-hand column, line 13-line 40.

European Search Report dated Sep. 27, 2002.

* cited by examiner

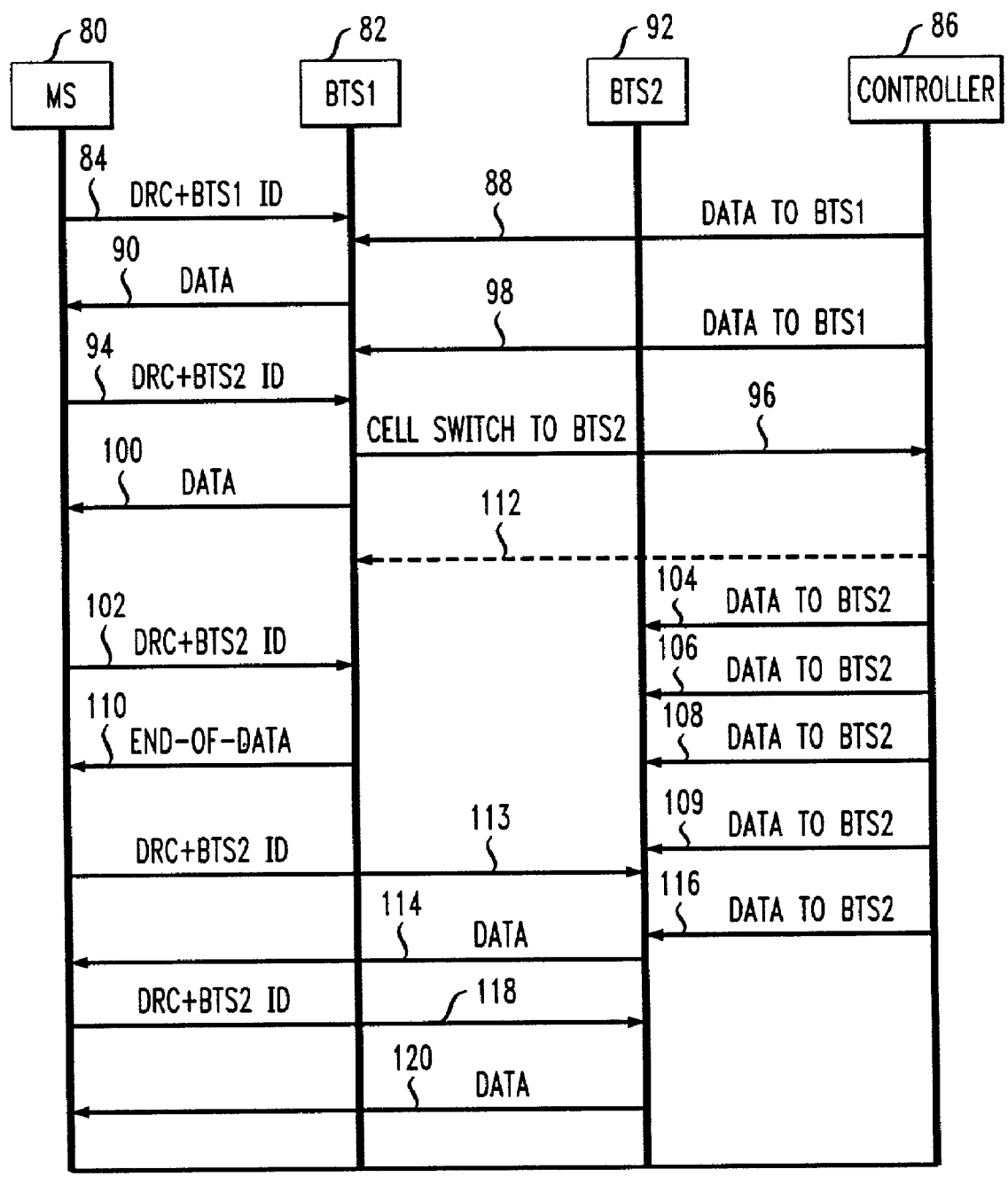

US 7,065,359 B2

SYSTEM AND METHOD FOR SWITCHING BETWEEN BASE STATIONS IN A WIRELESS COMMUNICATIONS SYSTEM

BACKGROUND OF THE INVENTION

1. Field of the Invention

This invention relates to wireless communications and, more particularly, to a system and method for switching between base stations.

2. Description of Related Art

Wireless communications systems include conventional cellular communication systems which comprise a number of cell sites or base stations (BTS), geographically distributed to support transmission and receipt of communication signals to and from wireless or units which may actually be stationary or fixed. Each base station handles communications over a particular region called a cell, and the overall coverage area for the cellular communication system is defined by the union of cells for all of the base stations, where the coverage areas for nearby cell sites overlap to some degree to ensure (if possible) contiguous communications coverage within the outer boundaries of the system's coverage area.

When active, a wireless unit receives signals from at least one base station or cell site over a forward link or downlink and transmits signals to (at least) one cell site or base station over a reverse link or uplink. There are many different schemes for defining wireless links or channels for a cellular communication system, including TDMA (time-division multiple access), FDMA (frequency-division multiple access), and CDMA (code-division multiple access) schemes. In CDMA communications, different wireless channels are distinguished by different channelization codes or sequences that are used to encode different information streams, which may then be modulated at one or more different carrier frequencies for simultaneous transmission. A receiver can recover a particular stream from a received signal using the appropriate code or sequence to decode the received signal.

Due to the delay-intolerant nature of voice communication, wireless units in conventional cellular systems transmit and receive over dedicated links between a wireless unit and a base station. Generally, each active wireless unit requires the assignment of a dedicated link on the forward link and a dedicated link on the reverse link. Traditional data applications are typically bursty and, unlike voice communications, relatively delay tolerant. However, wireless communication systems are evolving that will support a variety of real-time data services, such as providing voice over Internet Protocol (IP) using data packets to carry the voice information.

In a well known data only evolution of the third generation CDMA standard (hereinafter referred to as 3G-1x EVDO), voice and data services are provided using separate frequency carriers. Data is transmitted over a time division multiplexed carrier at variable data rates. Specifically, measured signal to interference ratio (SIR) or carrier to interference ratio (C/I) at the receiver is used to determine a data rate which can be supported by the receiver. In 3G-1x EVDO, the wireless unit performs the rate calculation using measurements of a pilot signal broadcast from the base station and reports back the rate at which it is going to receive data from the base station on a data rate control (DRC) channel. The DRC channel is spread using a Walsh code assigned to the base station sending the downlink packets to the wireless unit and is only received by that base station. The base station receives the reported rate and sends downlink packets at the reported rate.

FIG. 1 shows a the high data rate (HDR) architecture 10 for a 3G-1x EVDO system. In this architecture 10, base stations (BTSs) 12a–b perform the function of interfacing to the wireless unit or access terminal 14 (AT) over the air interface 16 with the radio access system 17. Each BTS 12a–b contains the hardware and software to perform the digital signaling processing required to implement the HDR air interface and to communicate with the other components of the radio access network 17. The BTS also contains the radio frequency (RF) components required to transmit the RF signals carrying the data over the air and to receive RF signals from the AT 14. A backhaul network 18, which can be implemented using a router(s), terminates the backhaul interfaces from several BTSs. This function is required to allow routing of information received from the air interface 16 to a control point for a session, where frame selection can be performed. The network 18 also allows routing of data between the BTSs 12a–b.

A mobility server 19 includes a controller 20 and a packet control function 24. The controller 20 provides signaling and traffic processing control for each session. These functions include session establishment and release (performed by a functional entity called the Overhead Manager (OHM), frame selection and Radio link protocol (RLP) processing and RLP and Signaling Manager. These are collectively referred to as the HDRC function. The packet control function (PCF) 24 provides the processing for a standard A10/A11 R-P interface 28 to the PDSN and allows the HDRC functions to interface to a packet data service node (PDSN) 32. The A10/A11 interface terminates all mobility management functions of the radio access network 17. The PDSN 32 terminates a point to point protocol (PPP) link protocol with the AT 14. The PDSN 32 maintains link layer information with the PCF, and routes packets to external packet data networks. A network management function 33 can handle billing, authentication and providing various services.

When performing communications on the uplink, the AT 14 will send data to BTSs 12a–b in the active set of the AT 14. The AT14 maintains a list of BTSs 12a–b referred to as the active set which includes the BTSs 12a–b with which the AT14 is in communication. The uplink data arrives at the various BTS 12a–b and are forwarded by these BTS 12a–b to the controller 20. The controller 20 selects a frame using some quality criteria among the received frames. The controller 20 will also assemble the layer 3 packet from the RLP frames. Then, the resulting layer 3 packet will be forwarded to the PCF 24 and later to PDSN 32 to be routed to the final destination. All the BTSs 12a–b in the active set of the AT 14 listen to the AT 14 on the uplink. The AT 14 selects the BTSs 12a–b which are in the active set based on downlink channel quality. Downlink channel quality is determined based on measurements of pilot signals transmitted from the BTSs 12a–b. When the AT 14 communicates with more than one BTS 12a–b at the same time, the AT 14 is in soft handoff with those BTSs.

In the downlink direction, soft handoff is not supported. The AT 14 performs RF measurements and selects, based on such measurements, which BTS the AT 14 is to receive downlink data from. Accordingly, the AT 14 will establish downlink data link with one BTS, for example with BTS 12a. Downlink packets arriving at PDSN 32 for the AT 14 are routed via the A10–A11 interface 28 to the PCF 24. The PCF 24 will route it via the controller 20 to the appropriate BTS 12a–b that the AT 14 is communicating with at that particular instant. When the AT 14 decides to switch to a new BTS, for example to BTS 12b, for downlink data communication, the AT14 will not send any frames on the DRC Channel to the existing BTS 12a. Instead, the AT 14 will start sending signals on a DRC Channel to the new BTS 12b it has selected. Such signals can be sent every 1.67 ms several (say N=3) times.

The BTS12a will timeout eventually and send a message to the controller 20. BTS 12b will have received multiple signals on the DRC channel from the AT 14 that indicate that the AT 14 has intended to switch to BTS 12b. The BTSs 12b then sends some signaling messages to the controller 20 to indicate that the AT 14 has selected the new BTS 12b. The delay between the time that the AT14 sends signals on the DRC Channel of the new BTS 12b by changing to a Walsh code associated with the new BTS 12b and the time that the new BTS 12b receives the first downlink frame from the controller 20 can cause data packets to be delayed or lost. Note, after the AT14 has switched to the new BTS 12b, the AT 14 is not receiving any downlink data from BTS 12b since the controller 20 is not aware that the AT 14 has switched to the BTS 12b and is still forwarding traffic to the old base station BTS 12a. While this delay may be okay for web-browsing type of applications, it is definitely not desirable for voice over IP (VoIP) or real-time applications. With a packetization interval of 20 ms, 5 voice packets can be missed with a break of 100 ms.

In a more detailed example, on the downlink, the AT 14 receives data from only one BTS 12a at any given time. The DRC (Data Rate Control) channel established on the air link 16 is used by the AT 14 to indicate to the Radio Access Network 17 the forward traffic channel data rate that should be used to send to the AT 14. The encoding used to send the DRC information also selects the best serving BTS for the forward traffic channel. The AT 14 selects a rate based on the carrier to interference (C/I) estimate of the best serving BTS. The supported forward traffic channel data rate is mapped to a 4 bit DRC symbol to be transmitted on the DRC channel. An 8-ary Walsh code corresponding to the best serving BTS is used to spread the DRC channel transmitted. Each DRC symbol corresponds to a forward traffic channel data rate. Each 8-ary Walsh code corresponds to a BTS in the active set. The mapping is defined by DRCCover. The AT 14 reports the DRC Symbol and the DRCCover on the DRC Channel, to indicate the required transmission rate on the forward traffic channel and the current BTS 12a.

If the AT 14 decides to switch to a new BTS 12b, the AT 14 changes the DRCCover to that of the new BTS 12b and switches to receive downlink data packets from the new BTS 12b. The new BTS 12b receives the DRCCcover from the AT 14, and the new BTS 12b informs the controller 20 that the new BTS 12b has been selected by the AT14 to transmit downlink traffic by to AT 14. The controller 20 arranges to establish the new BTS 12b as the transmission point for the downlink traffic to the AT14 for the session. However, a delay, for example of 100 ms, can occur from the time that the AT14 reports the DRC Cover for the new BTS 12b and the time that the downlink traffic is forwarded to the new BTS 12b. During that delay, data packets that are forwarded to the old BTS 12a from the controller 20 are lost and/or delayed because the AT14 has already switched to the new BTS 12b.

One solution to eliminate the delay in switching between BTSs on the downlink to provide a seamless virtual handoff is to let the controller 20 multicast downlink data to all base BTS 12a–b in the active list. That way, when the AT 14 picks a new BTS, the new BTS already has downlink data that it can send to AT 14 so there will not be any missing downlink data. However, such a solution is not too attractive because it is not uncommon to have 3–6 BTSs in the active list. Such a multicast solution increases the backhaul transport cost (between the controller 20 and the various BTS 12a–b).

SUMMARY OF THE INVENTION

The present invention is a base station switching system in which a wireless unit waits before switching from a previous base station to a new base station after the wireless unit has indicated to the wireless communications system the identity of the new base station. Thus, the wireless unit continues to receive data from the previous base station, and the data forwarded to the previous base station will not be lost. For example, whenever a wireless unit decides to switch to a new base station, the wireless unit sends an indication to the wireless communications system of the identity of the selected base station. Before the wireless communications system can forward the data to the new base station, the wireless communications system continues to forward data to the previous base station. To avoid losing such data, the wireless unit continues receiving data from the previous base station. Once the previous data forwarded to the previous base station is sent to the wireless unit and/or the new data has been forwarded to the new base station, the wireless communications system can signal the wireless unit, and in response, the wireless unit can begin receiving data from the new base station.

BRIEF DESCRIPTION OF THE DRAWINGS

Other aspects and advantages of the present invention may become apparent upon reading the following detailed description and upon reference to the drawings in which:

FIG. 3 shows a general signaling diagram between a wireless unit and a 3G-1x EVDO wireless communications system using the cell switching system and method according to principles of the present invention.

DETAILED DESCRIPTION

Illustrative embodiments of the base station switching system are described with respect to a 3G-1x EVDO system where data (in data packets which include routing and information and a data payload) are transmitted via frames from a base station to a wireless unit on the downlink using a shared data channel. Data can include any form of information including voice information. In this embodiment, the data channel is shared because wireless units request access to the data channel or resources for data packet transmission. The wireless communications system assigns a wireless unit for a particular period of time to the data channel to receive data from a base station. An uplink control channel associated with the downlink data channel is used to identify the base station from which and the data rate at which the wireless unit wants to receive the data. Other downlink channel structures and/or associated uplink channel arrangements as well as other data channel sharing arrangements are possible.

Figure 1:
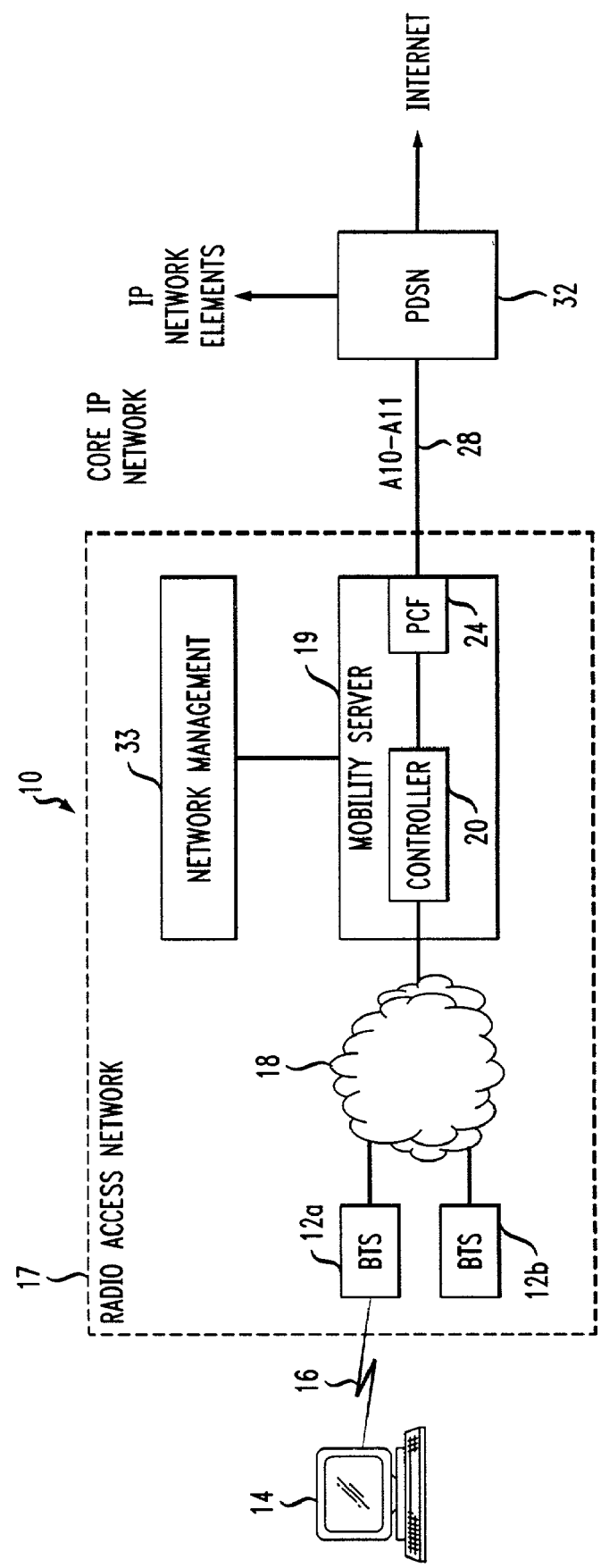
FIG. 1 shows a general block diagram of a wireless unit and a wireless communications system using a typical 3G-1x EVDO architecture.
Figure 2:
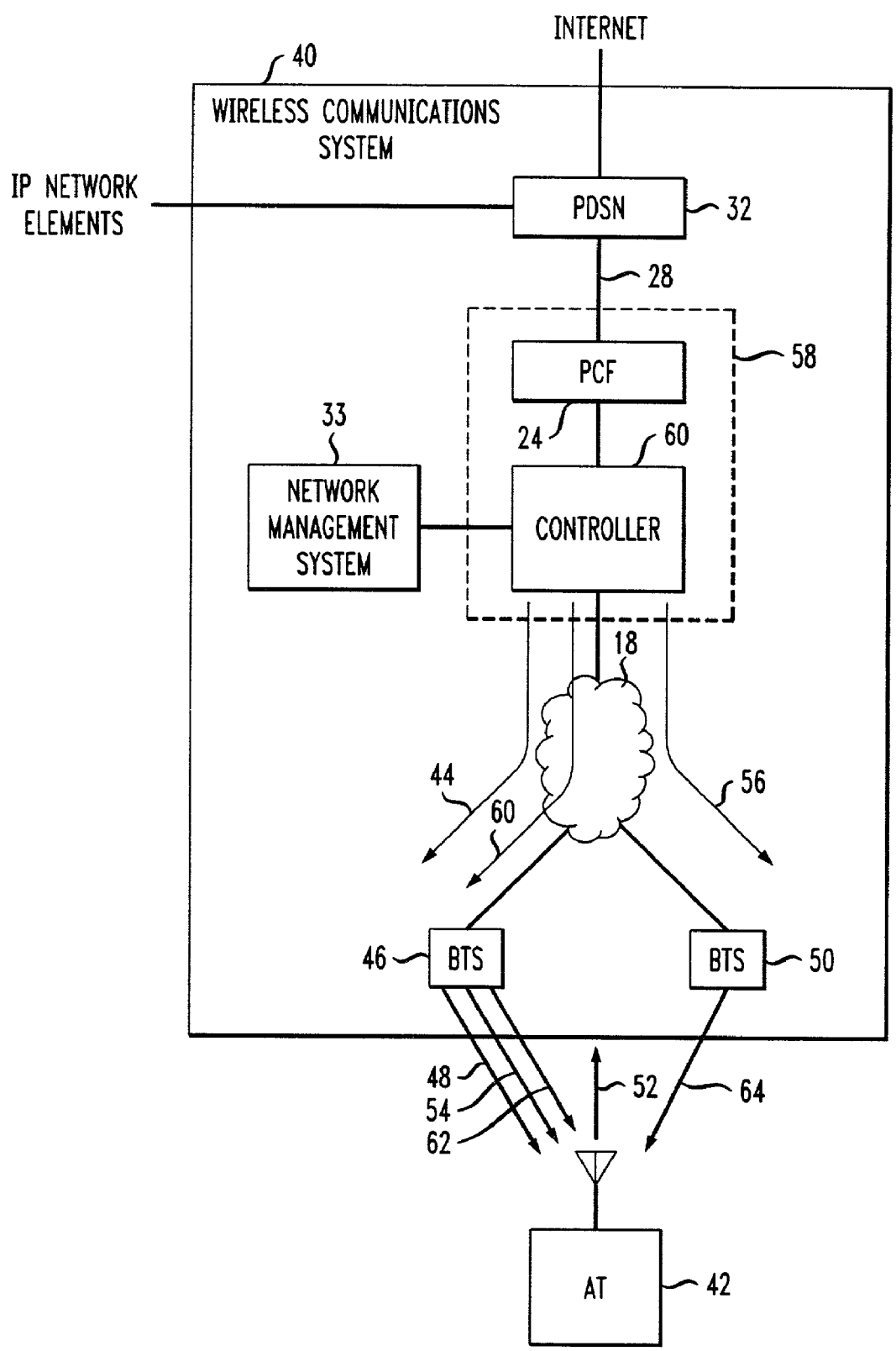
FIG. 2 shows a general block/signal flow diagram between a wireless unit and a 3G-1x EVDO wireless communications system using the cell switching system and method according to principles of the present invention.

FIG. 2 depicts a block/signal diagram of an embodiment of the base station or cell switching system and method of the present invention used between a wireless communications system 40 and a wireless unit or access terminal (AT) 42 for a 3G-1x EVDO system where like reference numerals indicate analogous elements to FIG. 1. Signal 44 shows that downlink data being routed from server 19 to base station (BTS) 46, and the BTS 46 transmits the data over the air link to the wireless unit 42 as shown by signal 48 on a downlink traffic or data channel. As the wireless unit moves about, the wireless unit may want to receive data from a different base station. For example, if the wireless unit 42 detects a degradation in the airlink, for example if the power level (or another signal quality measurement, such as bit error rate or frame error rate) of a pilot signal from the BTS 46 and/or of the downlink traffic channel falls below a threshold value, the wireless unit 42 may decide to switch to a new base station. For example, the wireless unit 42 may decide to switch to BTS 50. The wireless unit 42 can select the BTS 50 as the BTS in the active set of the wireless unit 42 with the highest associated pilot signal power measurements. Other ways can be used for the wireless unit 42 to select the new BTS 50 from which to receive downlink data.

When the wireless unit 42 decides to switch to a new BTS 50, the wireless unit 42 indicates to the wireless communications system 40 the identity of the new BTS 50 as shown by signal or arrow 52. For example, in accordance with certain aspects of the present invention, the wireless unit 42 indicates the identity of the new BTS 50 using a broadcast channel, for example using a common Walsh code, to broadcast information which can be used to identify the new BTS 50. As such, multiple base stations, which can include the previous BTS 46 and the new BTS 50, can receive the indication that the wireless unit 42 has decided to handoff to or switch to the new BTS 50 in receiving downlink data. Alternatively, the wireless unit 42 can inform the previous BTS 46 that the wireless unit 42 has decided to switch to the new base station 50. In alternative embodiments, the wireless unit 42 can inform the new BTS 50 that the wireless unit 42 has decided to switch to the new base station 50.

In accordance with principles of the present invention, the wireless unit 42 waits for an indication that the BTS 50 is ready to transmit packets to the wireless unit 42 and/or that the data forwarded to the previous base station 46 has been sent before switching to receive packets from the new BTS 50. Previous systems lost packets by indicating to the new BTS 50 that the wireless unit 42 is expecting to receive packets from the new base station 50 and switching to receive packets from the new BTS 50. For example, an uplink data rate control (DRC) channel transmits information from the wireless unit to the base station on controlling the downlink traffic channel. By changing the base station which receives that channel, for example by changing the DRCCover (including a base station id) or the Walsh code for the DRC channel, the wireless unit 42 indicates to the wireless communications system 40 that the wireless unit 42 is switching to the new BTS 50 to receive downlink data from the new BTS 50. In the embodiment of FIG. 2, after the wireless unit 42 has indicated to the wireless communications system 40 of the switching to the new BTS 50, the wireless unit 42 continues to receive data from the previous BTS 46 as shown by arrow 54. As such, the wireless communications system 40 has the time to redirect the downlink data for the wireless unit 42 to the new BTS 50 as shown by arrow 56.

In this embodiment, once a controller 60 has redirected the packets to the new BTS 50 and/or the data forwarded to the previous base station 46 has been sent to the wireless unit 42, the wireless communications system 40 signals the wireless unit 42 to begin receiving data from the new BTS 50. In this embodiment, the controller 60 sends a message to the previous BTS 46 as shown by arrow 60 to indicate that the wireless unit 42 can begin receiving data from the new BTS 50. The previous BTS 46 signals the wireless unit 42 to complete the switch to the new BTS 50 as shown by arrow 62 and begin receiving data from the new BTS 50. In response, the wireless unit 42 switches to the new BTS 50 and receives data from the new BTS 50 as shown by signal 64. In alternative embodiments, the indication to switch to the new BTS 42 after informing the wireless communications system of the identity of the new BTS 50 can occur in different ways. For example, the indication to switch to the new BTS 50 can be the expiration at the wireless unit 42 of a timer or period of time.

FIG. 3 shows a signaling diagram of an embodiment of the cell or base station switching system of FIG. 2. As shown, the wireless unit or mobile station (MS) 80 sends, on the DRC channel, information on the data rate (DRC Symbol (DRC)) of the downlink channel and a base station identifier (BTS1 id) as shown by signal 84. The transmission on the DRC channel identifies the base station (BTS1) 82 as the base station that the wireless unit 80 wants to receive packets from on the data channel on the downlink. Depending on the embodiment, the base station or cell can be identified by a base station or cell identification information and/or by using the Walsh code to spread the DRC signals so that only the selected base station can receive the DRC channel. The controller 86 has already established that downlink packets destined for the wireless unit 80 are routed to BTS 82 and does so as shown by signal 88. The BTS 82 then transmits the downlink packets over the data channel as shown by arrow 90 to the wireless unit 80 according to the information transmitted previously by the wireless unit 80 on the uplink DRC channel.

Whenever the wireless unit 80 decides to switch cells or base stations, the wireless unit sends cell or base station selection information (in the form of base station ID for base station 92 (BTS2) to the base station 82 (BTS1) as shown by arrow 94. In alternative embodiments, the wireless unit sends to a plurality of base stations, for example all the BTSs in the active set, the identity of the selected base station 92 (BTS2), for example using a common Walsh code or broadcast channel. After the BTS1 receives the identity of BTS2 as the base station which the wireless unit 40 has selected from which to receive downlink data from on the downlink channel, the base station 82 sends a signal 96 to the controller 86 signaling a switch to BTS2. However, because data had been sent to the previous base station 82 (BTS1) as shown by arrow 98, those data would be lost if the wireless unit 80 switched to BTS2, for example by changing to the Walsh code of the base station 92 (BTS2).

Instead, according to principles of the present invention, the wireless unit continues to receive data from the base station 82(BTS1) as shown by arrow 100. In this embodiment, after a certain time interval, for example every 1.67 ms, the wireless unit 80 sends the data rate information and the base station identification information for the new BTS2 (data rate control symbol (DRC)+BTS2 id) to the previous base station (BTS1) as shown by arrow 102. Once the controller 86 has redirected the downlink data for the wireless unit 80 to the selected base station 92 (BTS2), the controller 86 forwards the data to the new base station 92 (BTS2) as shown by arrows 104, 106, 108 and 109. If need be, such data can be buffered in the new BTS2. In this embodiment, when data packets which were forwarded to the previous base station 82 (BTS1) have all been transmitted to the wireless unit 80 from the previous base station 82 (BTS1), the BTS1 sends an end of data signal 110 which can be used to trigger the wireless unit 80 to switch to the new base station 92 (BTS2), for example by switching the Walsh code used to transmit on the DRC channel to the selected base station (BTS2). In alternative embodiments, the controller 86 can send a message 112 to the previous base station 82 that the controller 86 is ready to send data packets to the new base station 92 (BTS2). At that point, the BTS1 can either send all the data or send a message to the wireless unit 80 to switch to the new base station 92 (BTS2).

After the wireless unit 80 switches to the new base station 92 (BTS2), the wireless unit sends the DRC information (data rate control symbol (DRC)+BTS2 id) over the DRC channel to the new base station 92 (BTS2) as shown by signal 113. The wireless unit 80 then receives downlink data from the new base station 92c (BTS2) as shown by arrow 114. At this point the switch to the new base station 92 (BTS2) is complete. The controller 86 forwards downlink data to the new base station 92 (BTS2) as shown by signal 116. In response to the data rate information received on the DRC channel as shown in signal 118, the new base station 92 (BTS2) sends downlink data to the wireless unit 80 as shown by signal 120.

In order to prevent the wireless unit 80 from losing downlink data due to the degradation in the link quality between the previous base station 82 (BTS1) and the wireless unit 80, the threshold(s) that the wireless unit 80 uses to trigger sending of such base station or cell selection information to switch base stations at signal 94 will have to be lower than in existing systems. For example, such a threshold can be adjusted to take into account that the wireless unit 80 will not immediately switch to receive packets from the new BTS2 and will continue to receive data from the old BTS1. Depending on the embodiment, the old base station 92 may need to receive multiple such signals before BTS1 forward a cell switching message 96 to the controller 86.

In addition to the embodiment(s) described above, the base station switching system and method has been described for use in a 3G-1x EVDO system or evolution thereof where the downlink data channel is a shared, time division multiplexed channel made up of at least one channelization code. The base station switching system according to the principles of the present invention can be used with different cellular systems and uplink and/or downlink configurations which omit and/or add components and/or use variations or portions of the described system. For example, the base station switching system and method can be implemented in a Universal Mobile Telecommunication Service (UMTS) wireless communications system or in a 3G-1x EVDV system or evolutions thereof and in the wireless units communicating therewith.

The base station switching system has been described as sending base station identification information indicating the base station from which the wireless unit wants to receive downlink data. Such information can be sent in the form of a base station id for the new base station sent to the current base station on the DRC channel for the current base station and the wireless unit. Other ways of indicating to the wireless communications system of the decision to switch to a new base station are possible. For example, the indication could be sent in a broadcast channel received by multiple base stations. One way to implement broadcast notification is to reduce active set to 7 base stations and choose one Walsh code to be a broadcast channel i.e. all base stations must monitor this Walsh function. Whenever the wireless unit wants to switch base station, it will send base station id, for example a couple of times, followed by the chosen transmitted rate. Additionally, the base station id can be coded to recover from any transmission errors. Moreover, the coded base station id can covered with a cyclic redundancy check (CRC) to detect transmission errors. In a future 1xEV DV system, information bits may be allocated to carry base station identifiers rather than using the Walsh codes. In that case, to implement, such information bits can be sent to all BTSs in the active set. In other embodiments, the way of identifying the base station with which the wireless unit wants to communicate can be achieved by sending a signal which can only be received by the selected base station although the wireless unit will continue to receive signals from the old base station.

It should be understood that the system and portions thereof and of the described switching system can be implemented in different locations, such as the wireless unit, the base station, a base station controller and/or mobile switching center using the base station as a conduit. Moreover, specific terminology is used which is based on the 3G-1x EVDO architecture, but the switching system can be employed in analogous or different portions of different wireless communications systems. The base station switching system and method can be implemented in application specific integrated circuits, software-driven processing circuitry, firmware, programmable logic devices, hardware, discrete components or arrangements of the above components as would be understood by one of ordinary skill in the art with the benefit of this disclosure. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

The invention claimed is:

1. A method of switching between a previous base station and a new base station in a wireless communications system having a shared downlink data channel that carries downlink data from the wireless communication system to at least one wireless unit, said method comprising the steps of:

sending signals from the wireless unit to said wireless communications system via an uplink control channel associated with the shared downlink data channel, wherein the signals indicate an identity of said new base station that the wireless unit has selected from which to receive downlink data;

waiting for an indication from the wireless communication system to switch to said new base station;

receiving downlink data from said previous base station via the shared downlink data channel until said indication; and switching to said new base station in response to said indication to switch to said new base station.

2. A method as claimed in claim 1 wherein said step of sending comprises:

sending signals indicating the identity of said new base station and downlink data rate information on said uplink control channel to said previous base station.

3. A method as claimed in claim 1 wherein said step of receiving comprises:

receiving downlink data from said previous base station via the shared downlink data channel until an indication from said previous base station that data for said wireless unit from said previous base station has been sent.

4. A method as claimed in claim 1 wherein said step of receiving comprises:
receiving downlink data from said previous base station via the shared downlink data channel until receiving a notification from said previous base station that data is being forwarded to said new base station.

5. A method as claimed in claim 1, wherein said step of sending comprises sending base station identification information on the uplink control channel associated wit the shared downlink data channel carrying said downlink data to said wireless unit.

6. A method as claimed in claim 5 wherein said step of sending comprises sending said base station identification information and downlink data rate information on said uplink control channel.

7. A method as claimed in claim 1, wherein the signals sent via the uplink control channel identifying the new base station comprise a Walsh code, and wherein the sending step comprises spreading the signals in the uplink control channel such that only the new base station receives the signals from the wireless unit.

8. A method as claimed in claim 1, wherein the indication comprises an indication message that is sent to the previous base station indicating that data packets are ready to be sent to the new base station.

9. A method as claimed in claim 8, wherein the indication message is an end of data signal indicating that the wireless unit has received all data from the previous base station.

10. A method as claimed in claim 1, wherein the indication is conducted repeatedly until the switching step is conducted.

11. A method as claimed in claim 1, wherein said step of sending comprises broadcasting said signals via said uplink control channel, which is a broadcast channel capable of being received by a plurality of base stations.

12. A method as claimed in claim 11, wherein the wireless unit notifies the previous base station regarding the switching to the new base station via the broadcast channel.

13. A method as claimed in claim 11, wherein the wireless unit notifies the new base station regarding the switching to the new base station via the broadcast channel.

14. A method of switching between a previous base station and a new base station in a wireless communications system having a shared downlink data channel that carries downlink data from the wireless communications system to at least one wireless unit, comprising the steps of:
receiving signals from the wireless unit, wherein die signals indicate the identity of said new base station that the wireless unit has selected from which to receive downlink data;
sending downlink data from said previous base station via the shared downlink data channel after receiving the signals from the wireless unit; and
waiting until after at least one of sending all downlink data from said previous base station is complete or directing downlink data for the wireless unit to said new base station before sending an indication to the wireless unit to switch to said new base station.

15. The method of claim 14, comprising sending at least one of an indication from said previous base station that sending the data for said wireless unit from said previous base station is complete or an indication from said previous base station that data is being directed to said new base station.

16. The method of claim 14, wherein the new base station receives the signals from the wireless unit.

17. A method of switching between a previous base station and a new base station in a wireless communications system having a shared downlink data channel that carries downlink data from the wireless communications system to at least one wireless unit, comprising the steps of:
(A) sending signals to said wireless communications system, wherein the signals indicate the identity of said new base station that the wireless unit has selected from which to receive downlink data;
(B) waiting for an indication from the wireless communications system to switch to said new base station;
(C) receiving downlink data from said previous base station via the shared downlink data channel until the wireless communications system completes at least one of sending all downlink data to the wireless unit from said previous base station or directing downlink data for the wireless unit to said now base station; and
(D) switching to said new base station in response to receiving said indication to switch to said new base station after step (C) is complete.

18. The method of claim 17, comprising receiving at least one of an indication from said previous base station that all the dowrilink data from said previous base station has been sent or an indication from said previous base station that the data for the wireless unit is being directed to said new base station.

19. The method of claim 17, comprising sending the signals that indicate the identity of the new base station to the new base station.

20. The method of claim 17, comprising broadcasting said signals that indicate the identity of the new base station via an uplink control channel, which is a broadcast channel capable of being received by a plurality of base stations, for notifying at least one of the previous base station or the new base station regarding the switching to the new base station.

* * * * *